(12) United States Patent
Jung et al.

(10) Patent No.: US 11,868,564 B2
(45) Date of Patent: Jan. 9, 2024

(54) TOUCH CONTROLLER, TOUCH SENSING SYSTEM, AND TOUCH DISPLAY DEVICE THAT DOES NOT OUTPUT A SYSTEM CLOCK DURING DATA COMMUNICATION

(71) Applicant: LG Display Co., Ltd., Seoul (KR)

(72) Inventors: Sojung Jung, Paju-si (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/966,370

(22) Filed: Oct. 14, 2022

(65) Prior Publication Data

US 2023/0168773 A1    Jun. 1, 2023

(30) Foreign Application Priority Data

Nov. 30, 2021    (KR) .................. 10-2021-0168367

(51) Int. Cl.
*G06F 3/041*       (2006.01)
*G09G 3/20*        (2006.01)

(52) U.S. Cl.
CPC .......... *G06F 3/0418* (2013.01); *G06F 3/0412* (2013.01); *G09G 3/20* (2013.01)

(58) Field of Classification Search
CPC .......... G06F 3/048; G06F 3/0412; G09G 3/20
See application file for complete search history.

(56) References Cited

U.S. PATENT DOCUMENTS

2015/0310824 A1*  10/2015  Yang .................. G09G 5/006
                                                345/213
2020/0192544 A1*  6/2020  Chung ................ G09G 3/3413

FOREIGN PATENT DOCUMENTS

KR      20190136257 A   * 12/2019

OTHER PUBLICATIONS

Machine Translation of Choi et al. (for Ref. N) (Year: 2019).*

* cited by examiner

*Primary Examiner* — Liliana Cerullo
(74) *Attorney, Agent, or Firm* — Fenwick & West LLP

(57) ABSTRACT

Embodiments of the present disclosure relate to a touch controller, a touch sensing system, and a touch display device. Among data communication periods between the touch controller and a touch driving circuit, during the data communication period included in a period in which a system clock signal is not output, a level of a communication control signal is changed a plurality of times, thereby allowing the touch driving circuit to recognize an address start time point. Therefore, it is possible to reduce power consumption of the touch sensing system by reducing a period in which the system clock signal is output and to improve the efficiency of data communication of the touch sensing system by enabling normal data communication in a period in which the system clock signal is not output.

18 Claims, 10 Drawing Sheets

<Case A>

<Case B>

<EX 1>

<EX 2>

TOUCH CONTROLLER, TOUCH SENSING SYSTEM, AND TOUCH DISPLAY DEVICE THAT DOES NOT OUTPUT A SYSTEM CLOCK DURING DATA COMMUNICATION

CROSS REFERENCE TO RELATED APPLICATION

This application claims priority from Republic of Korea Patent Application No. 10-2021-0168367, filed on Nov. 30, 2021, which is hereby incorporated by reference in its entirety.

BACKGROUND

1. Field of Technology

Embodiments of the present disclosure relate to a touch controller, a touch sensing system, and a touch display device.

2. Description of the Prior Art

In order to provide more various functions to a user, a display device may provide a function of detecting a user's touch on a display panel and processing an input based on the detected touch.

A display device may include a plurality of touch electrodes disposed in a display panel and a touch sensing system configured to detect a touch by driving the plurality of touch electrodes.

As an example, the touch sensing system may include a touch driving circuit which outputs a touch driving signal to the touch electrode and receives a touch sensing signal from the touch electrode and a touch controller which controls the touch driving circuit.

The touch controller may receive sensing data from the touch driving circuit to perform touch sensing, and may transmit control data for controlling the touch driving circuit to the touch driving circuit. When data communication between the touch controller and the touch driving circuit is not smoothly performed, the touch sensing system may not operate normally, or the performance of the touch sensing system can be degraded.

SUMMARY

An embodiment of the present disclosure provides a method capable of reducing power consumption of a touch sensing system and improving the efficiency of data communication between a touch driving circuit and a touch controller included in the touch sensing system.

Embodiments of the present disclosure provide a touch display device including a plurality of touch electrodes disposed in a display panel, a touch driving circuit configured to drive the plurality of touch electrodes, and a touch controller configured to control the touch driving circuit.

During at least one data communication period of a plurality of data communication periods in which the touch controller transmits data to the touch driving circuit, a level of a communication control signal, which is output by the touch controller and input to the touch driving circuit, may be changed two or more times.

In another embodiment, the present disclosure provides a touch sensing system including a touch driving circuit configured to drive a plurality of touch electrodes, and a touch controller configured to control the touch driving circuit.

The touch controller may be configured to output a system clock signal when a certain time has elapsed after a touch synchronization signal corresponding to a touch mode is output, a first data communication period and a second data communication period may be present before the system clock signal is output, and during at least one of the first data communication period and the second data communication period, a level of a communication control signal, which is output by the touch controller and input to the touch driving circuit, may be changed two or more times.

In still another embodiment, the present disclosure provides a touch controller which transmits data during two or more communication periods before outputting a system clock signal and after outputting a touch synchronization signal corresponding to a touch mode and changes a level of a communication control signal during at least one period of the two or more data communication periods.

According to embodiments of the present disclosure, since, during a period in which data communication is performed between a touch controller and a touch driving circuit, the touch driving circuit can recognize a data transmission time through a level change of a communication control signal, even during a period in which a system clock signal is not output, the data communication between the touch controller and the touch driving circuit can be normally performed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
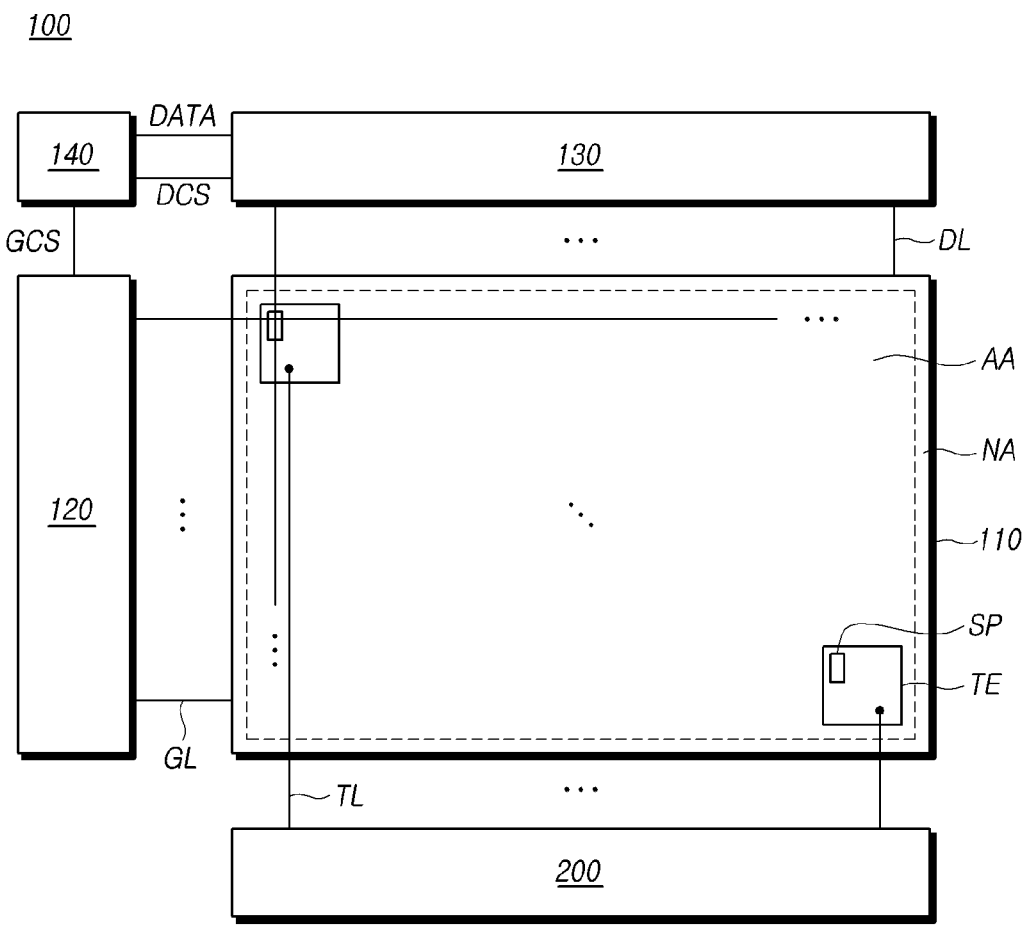
FIG. 1 is a schematic diagram illustrating a configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a schematic diagram illustrating a configuration of a touch display device 100 according to embodiments of the present disclosure.

Referring to FIG. 1, the touch display device 100 may include a display panel 110, a gate driving circuit 120, a data driving circuit 130, and a controller 140 which are for driving the display panel 110.

The touch display device 100 may include a plurality of touch electrodes TE disposed in the display panel 110 to sense a touch. The touch display device 100 may include a touch sensing system 200 which drives the touch electrode TE and performs touch sensing.

The display panel 110 may include an active area AA in which a plurality of subpixels SP are disposed and a non-active area NA positioned outside the active area AA. Each of the plurality of touch electrodes TE may be disposed in an area corresponding to two or more subpixels SP. But embodiments of the present disclosure is not limited thereto. For example, each of the plurality of touch electrodes TE may be disposed in an area corresponding to one subpixel SP or even smaller area.

A plurality of gate lines GL and a plurality of data lines DL may be disposed in the display panel 110, and a subpixel SP may be positioned in an area in which the gate line GL and the data line DL intersect. A plurality of touch lines TL electrically connected to the touch electrodes TE may be disposed in the display panel 110.

When a configuration for display driving in the touch display device 100 is described, the gate driving circuit 120 is controlled by the controller 140 and sequentially outputs scan signals to the plurality of gate lines GL disposed in the display panel 110 to control a driving timing of the plurality of subpixels SP.

The gate driving circuit 120 may include one or more gate driver integrated circuits (GDICs) and may be positioned at only one side or both sides of the display panel 110 according to a driving method.

Each GDIC may be connected to a bonding pad of the display panel 110 in a tape automated bonding (TAB) type or a chip-on-glass (COG) type. Alternatively, each GDIC may be implemented as a gate-in-panel (GIP) type and disposed directly on the display panel 110. Alternatively, each GDIC may be integrated with and disposed on the display panel 110. Alternatively, each GDIC may be implemented as a chip-on-film (COF) type mounted on a film connected to the display panel 110.

The data driving circuit 130 receives image data from the controller 140 and converts the image data into an analog data voltage. The data driving circuit 130 allows each subpixel SP to express brightness according to image data by outputting a data voltage to the data line DL according to a timing at which a scan signal is applied through the gate line GL.

The data driving circuit 130 may include one or more source driver integrated circuits (SDICs).

Each SDIC may include a shift register, a latch circuit, a digital-to-analog converter, an output buffer, and the like.

Each SDIC may be connected to a bonding pad of the display panel 110 in a TAB type or a COG type. Alternatively, each SDIC may be disposed directly on the display panel 110. Alternatively, each SDIC may be integrated with and disposed on the display panel 110. Alternatively, each SDIC may be implemented as a COF type. In this case, each SDIC may be mounted on a film connected to the display panel 110 and may be electrically connected to the display panel 110 through lines on the film.

The controller 140 may supply various control signals to the gate driving circuit 120 and the data driving circuit 130 and may control the operations of the gate driving circuit 120 and the data driving circuit 130.

The controller 140 may be mounted on a printed circuit board, a flexible printed circuit, or the like and may be electrically connected to the gate driving circuit 120 and the data driving circuit 130 through the printed circuit board, the flexible printed circuit, or the like.

The controller 140 allows the gate driving circuit 120 to output a scan signal according to a timing set in each frame. The controller 140 converts image data input from an external device to be suitable for a data signal format used by the data driving circuit 130 and outputs the converted image data to the data driving circuit 130.

The controller 140 receives various timing signals including a vertical synchronization signal VSYNC, a horizontal synchronization signal HSYNC, an input data enable (DE) signal, and a clock signal CLK together with image data from an external device (for example, a host system).

The controller 140 may generate various control signals using the various timing signals received from the external device and may output the generated various control signals to the gate driving circuit 120 and the data driving circuit 130.

As an example, in order to control the gate driving circuit 120, the controller 140 outputs various gate control signals (GCSs) including gate start pulse (GSP), gate shift clock (GSC), and gate output enable (GOE) signals. The GSP signal controls an operation start timing of one or more GDICs constituting the gate driving circuit 120.

The GSC signal is a clock signal commonly input to one or more GDICs and controls a shift timing of a scan signal. The GOE signal specifies timing information of one or more GDICs.

In addition, in order to control the data driving circuit 130, the controller 140 outputs various data control signals (DCSs) including source start pulse (SSP), source sampling clock (SSC), and source output enable (SOE) signals.

The SSP signal controls a data sampling start timing of one or more SDICs constituting the data driving circuit 130. The SSC signal is a clock signal that controls a sampling timing of data in each SDIC. The SOE signal controls an output timing of the data driving circuit 130.

The touch display device 100 may further include a power management integrated circuit which supplies various voltages or currents to the display panel 110, the gate driving circuit 120, the data driving circuit 130, or the like or controls the various voltages or currents to be supplied.

When a configuration for touch sensing in the touch display device 100 is described, the touch sensing system 200 may drive the plurality of touch electrodes TE disposed in the display panel 110.

The touch sensing system 200 may supply a touch driving signal to the touch electrode TE through the touch line TL and may receive a touch sensing signal from the touch electrode TE to detect the presence or absence of a touch and touch coordinates.

The touch electrode TE may be positioned outside the display panel 110 or inside the display panel 110.

When the touch electrode TE is positioned inside the display panel 110, the touch electrode TE may be an electrode disposed separately from an electrode for display driving. Alternatively, the touch electrode TE may be one of electrodes for display driving.

As an example, the touch electrode TE may be an electrode disposed by dividing a common electrode for display driving.

In this case, the touch electrode TE may perform a function of an electrode for touch sensing and a function of an electrode for display driving.

As an example, the touch electrode TE may be driven as the touch electrode TE and a common electrode in periods that are temporally divided. Alternatively, the touch electrode TE may simultaneously perform a function of the touch electrode TE and a function of the common electrode.

In this case, since a touch driving signal is applied to the touch electrode TE in a display driving period, a signal for display driving (for example, a data voltage or a scan signal) may be supplied in a modulated form based on the touch driving signal.

As described above, the touch sensing system 200 may perform touch sensing by supplying a touch driving signal to the touch electrode TE in a display driving period or a period temporally divided from the display driving period.

Figure 2:
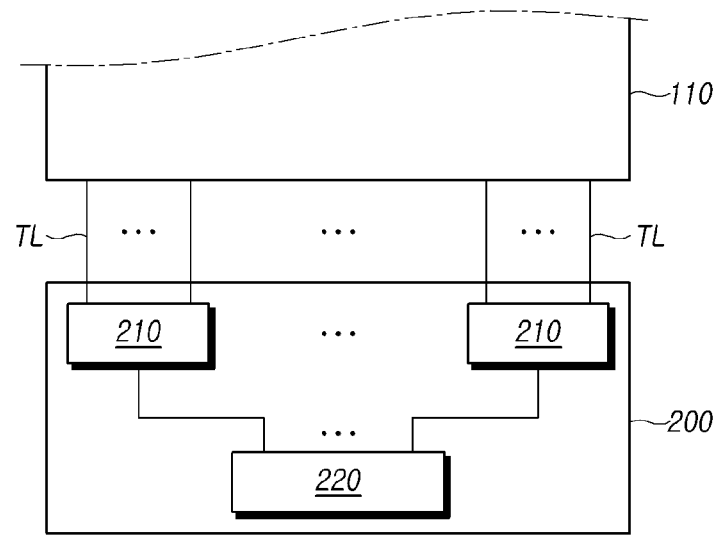
FIG. 2 is a schematic diagram illustrating a configuration of a touch sensing system according to embodiments of the present disclosure.

FIG. 2 is a schematic diagram illustrating a configuration of a touch sensing system 200 according to embodiments of the present disclosure.

Referring to FIG. 2, the touch sensing system 200 may include a touch driving circuit 210 and a touch controller 220.

The touch driving circuit 210 may be electrically connected to a plurality of touch lines TL. The touch driving circuit 210 may drive touch electrodes TE disposed in a display panel 110 through the touch lines TL. The touch driving circuit 210 may transmit data based on a touch sensing signal detected from the touch electrode TE through the touch line TL to the touch controller 220.

The touch sensing system 200 may include two or more touch driving circuits 210 according to a size of the display panel 110 as shown in FIG. 2.

The touch driving circuit 210 may be disposed on a printed circuit board or a flexible printed circuit. As an example, the touch driving circuit 210 may be mounted on a film and electrically connected to the display panel 110 through the film.

In some cases, the touch driving circuit 210 may be disposed in a form integrated with a data driving circuit 130. Alternatively, the touch driving circuit 210 may be disposed separately from the data driving circuit 130.

The touch controller 220 may control the touch driving circuit 210 to receive data according to touch sensing from the touch driving circuit 210. The touch controller 220 may detect the presence or absence of a touch on the display panel 110 and touch coordinates based on the data received from the touch driving circuit 210.

The touch controller 220 may control the touch driving circuit 210 and may transmit or receive data for performing touch sensing to or from the touch driving circuit 210.

Figure 3:
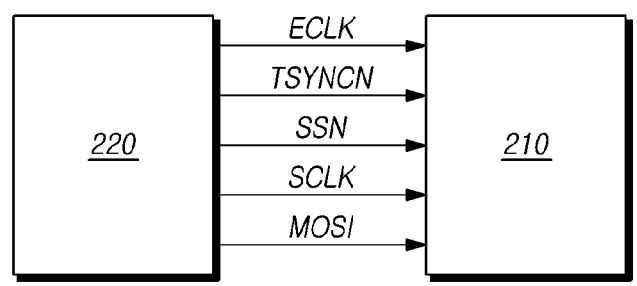
FIG. 3 is a diagram illustrating an example of a method of transmitting or receiving data between a touch driving circuit and a touch controller included in a touch sensing system according to embodiments of the present disclosure.

FIG. 3 is a diagram illustrating an example of a method of transmitting or receiving data between a touch driving circuit 210 and a touch controller 220 included in a touch sensing system 200 according to embodiments of the present disclosure.

Referring to FIG. 3, the touch controller 220 may transmit, for example, a system clock signal ECLK, a touch synchronization signal TSYNCN, a communication control signal SSN, and a data clock signal SCLK to the touch driving circuit 210.

The touch synchronization signal TSYNCN may be a signal indicating a period that corresponds to a touch mode. As an example, a period in which the touch synchronization signal TSYNCN is at a low level may be a period corresponding to a touch mode. A period in which the touch synchronization signal TSYNCN is at a high level may be a period corresponding to a display mode.

The touch driving circuit 210 may recognize a touch mode according to a level of the touch synchronization signal TSYNCN and may drive touch electrodes TE in the touch mode to perform touch sensing.

The system clock signal ECLK may be a basic clock signal which is output by the touch controller 220 to drive the touch driving circuit 210. The system clock signal ECLK may be a signal for synchronizing data transmitted from the touch controller 220 to the touch driving circuit 210. The system clock signal ECLK may be a clock signal used to recognize and transmit/receive various signals or data (for example, a communication control signal or touch data)

transmitted or received between the touch controller 220 and the touch driving circuit 210. The system clock signal ECLK may be output during a period in which the touch controller 220 is being driven and may be output only during a partial period in some cases. The system clock signal ECLK may be a clock signal output during a period in which the touch synchronization signal TSYNCN is at a low level.

The communication control signal SSN may be a signal indicating a period in which the touch controller 220 communicates with the touch driving circuit 210. As an example, the touch controller 220 may transmit data to the touch driving circuit 210 during a period in which the communication control signal SSN is at a low level. When the touch controller 220 controls a plurality of touch driving circuits 210, the touch driving circuit 210 to which the touch controller 220 transmits data may be designated by the communication control signal SSN.

The data clock signal SCLK may be a signal output during a data communication period in which the touch controller 220 transmits data to the touch driving circuit 210. The data clock signal SCLK may be output during a period in which the touch controller 220 transmits data, that is, during a period in which the communication control signal SSN is at a low level.

The touch controller 220 may transmit master-out-slave-in (MOSI) data to the touch driving circuit 210. Although not shown in FIG. 3, in some cases, the touch controller 220 may receive master-in-slave-out (MISO) data from the touch driving circuit 210.

The touch controller 220 may control the touch driving circuit 210 by transmitting the MOSI data to the touch driving circuit 210 according to various signals such as the system clock signal ECLK.

Figure 4:
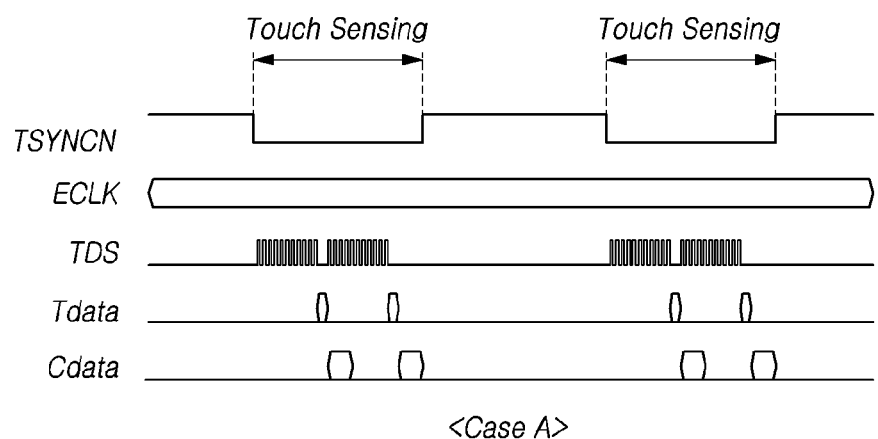
FIG. 4 shows diagrams illustrating examples of a signal transmitted and received by driving a touch sensing system according to embodiments of the present disclosure.
Figure 4:
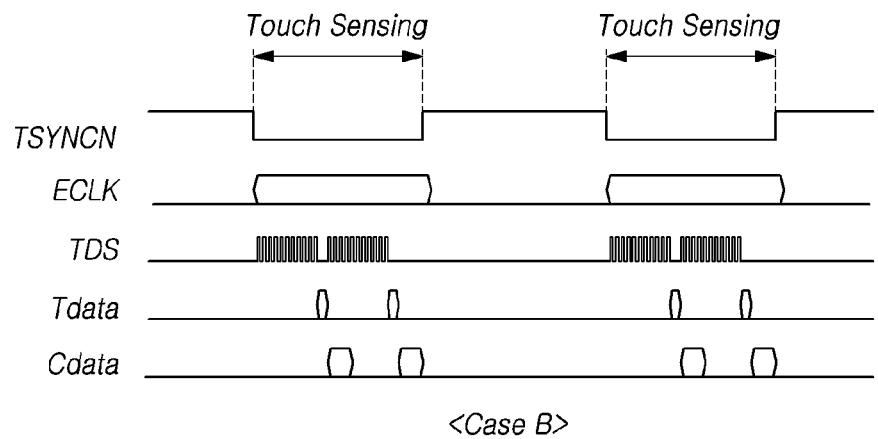

FIG. 4 shows diagrams illustrating examples of a signal transmitted and received by driving a touch sensing system 200 according to embodiments of the present disclosure.

Referring to FIG. 4, a touch synchronization signal TSYNCN may be output by a touch controller 220. As an example, the touch controller 220 may output the touch synchronization signal TSYNCN at a low level during a period corresponding to a touch mode and may output the touch synchronization signal TSYNCN at a high level during other periods.

A touch driving circuit 210 may perform touch sensing according to the touch synchronization signal TSYNCN input from the touch controller 220.

The touch controller 220 may output a system clock signal ECLK to the touch driving circuit 210.

The touch driving circuit 210 may perform touch sensing by supplying a touch driving signal TDS to a touch electrode TE during a period corresponding to a touch mode. The touch driving signal TDS may be supplied to the touch driving circuit 210 by, for example, the touch controller 220 or may be supplied to the touch driving circuit 210 by a touch power circuit in some cases.

The touch driving circuit 210 may transmit touch data Tdata according to touch sensing to the touch controller 220.

The touch controller 220 may transmit control data Cdata for controlling the touch driving circuit 210 to the touch driving circuit 210.

In a process in which the touch controller 220 transmits or receives data to or from the touch driving circuit 210 and controls the touch driving circuit 210, in order to reduce power consumption, the touch controller 220 may control a period in which the system clock signal ECLK is output.

As an example, as in Case A shown in FIG. 4, the touch controller 220 may output the system clock signal ECLK irrespective of a touch mode. The system clock signal ECLK may be output during a period in which the touch synchronization signal TSYNCN is at a low level and a period in which the touch synchronization signal TSYNCN is at a high level.

As another example, as in Case B shown in FIG. 4, the touch controller 220 may output the system clock signal ECLK only during a period corresponding to a touch mode. The system clock signal ECLK may not be output during a period in which the touch synchronization signal TSYNCN at a high level. The system clock signal ECLK may be output during a period in which the touch synchronization signal TSYNCN is at a low level.

The system clock signal ECLK may be output only during a period in which the touch synchronization signal TSYNCN is at a low level, thereby reducing power consumption of the touch sensing system 200.

In this case, the touch controller 220 may output the system clock signal ECLK when recognizing that the touch synchronization signal TSYNCN is changed from a high level to a low level.

A delay period may be present between a time point at which the touch synchronization signal TSYNCN is changed to a low level and a time point at which the system clock signal ECLK is output.

In some cases, the touch controller 220 may transmit the control data Cdata immediately after the touch synchronization signal TSYNCN is changed to a low level and before the system clock signal ECLK is output.

Embodiments of the present disclosure may provide a method in which, even when there is a delay period in which the system clock signal ECLK is not output immediately after the touch synchronization signal TSYNCN is changed to a low level, the touch controller 220 may transmit the control data Cdata to the touch driving circuit 210.

Figure 5:
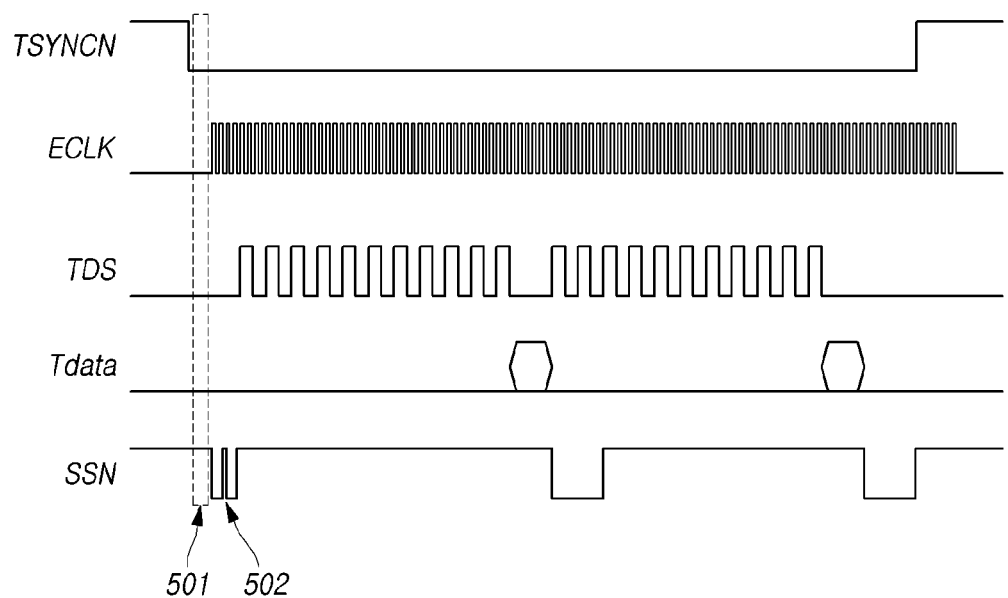
FIG. 5 is a diagram illustrating an example of a method in which the touch controller transmits control data in Case B shown in FIG. 4 according to embodiments of the present disclosure.

FIG. 5 is a diagram illustrating an example of a method in which the touch controller 220 transmits control data Cdata in Case B shown in FIG. 4. The control data Cdata may be transmitted during a period in which a communication control signal SSN is at a low level.

Referring to FIG. 5, the touch controller 220 may not output a system clock signal ECLK during a period in which a touch synchronization signal TSYNCN is at a high level. When the touch synchronization signal TSYNCN is changed to a low level, the touch controller 220 may output the system clock signal ECLK.

Since the touch controller 220 detects the touch synchronization signal TSYNCN at a low level and outputs the system clock signal ECLK, as in a portion indicated by 501, there may be a period in which the system clock signal ECLK is not output during a period in which the touch synchronization signal TSYNCN at a low level is output.

After a delay period in which the system clock signal ECLK is not output, as in a portion indicated by 502, the touch controller 220 may output the communication control signal SSN at a low level.

The touch controller 220 may change a level of the communication control signal SSN to a low level during a period in which the system clock signal ECLK is output after the delay period. While the level of the communication control signal SSN is maintained at the low level, the touch controller 220 may transmit the control data Cdata to the touch driving circuit 210.

In this case, power consumption of the touch sensing system 200 can be reduced to transmit the control data Cdata to the touch driving circuit 210, but a time point at which the control data Cdata is transmitted can be delayed due to the delay period indicated by 501.

Embodiments of the present disclosure may provide a method in which, by controlling a period in which the system clock signal ECLK is output, power consumption of the touch sensing system 200 is reduced, and during a period in which the system clock signal ECLK is not output, the touch controller 220 transmits the control data Cdata to the touch driving circuit 210.

Figure 6:
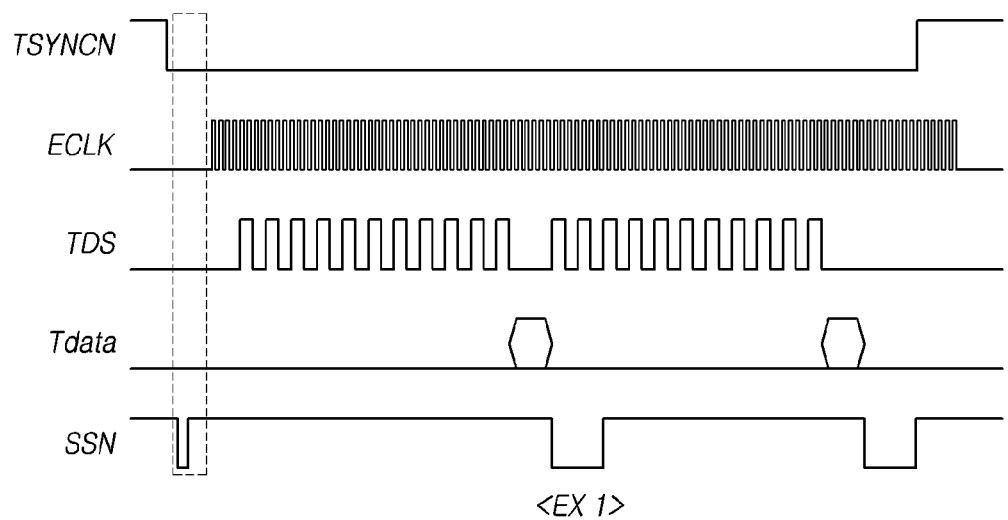
FIG. 6 shows diagrams illustrating another example of a method in which the touch controller transmits control data in Case B shown in FIG. 4 according to embodiments of the present disclosure.
Figure 6:
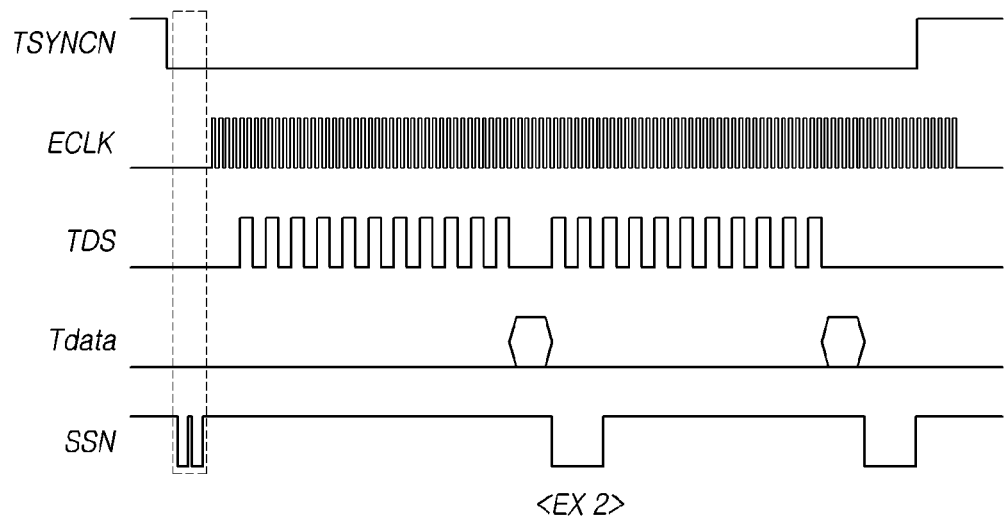

FIG. 6 shows diagrams illustrating another example of a method in which the touch controller 220 transmits control data Cdata in Case B shown in FIG. 4. The control data Cdata may be transmitted during a period in which a communication control signal SSN is at a low level.

Figure 7:
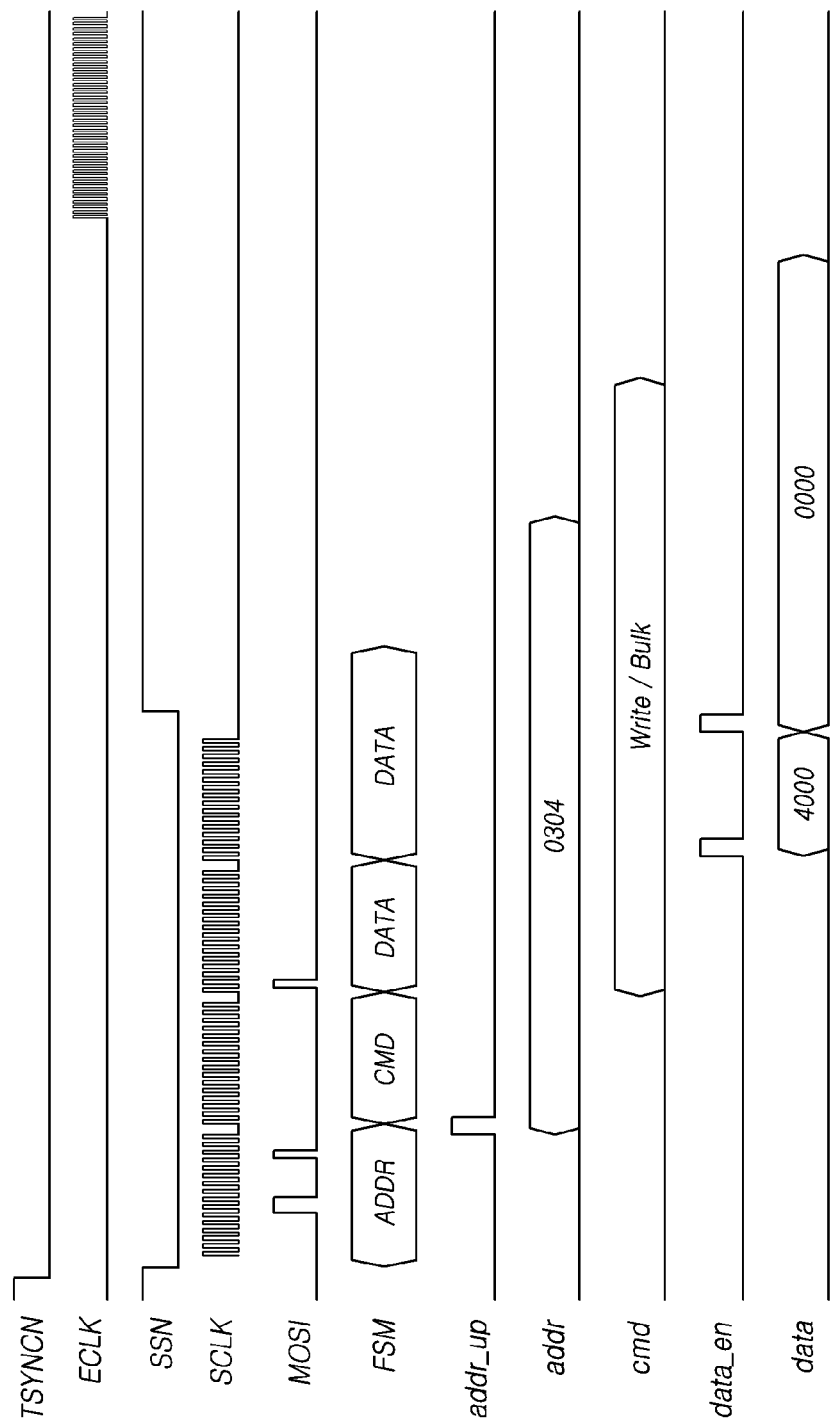
FIG. 7 is a diagram illustrating an example of a specific method in which the touch controller transmits control data in EX 1 shown in FIG. 6 according to embodiments of the present disclosure.
Figure 8:
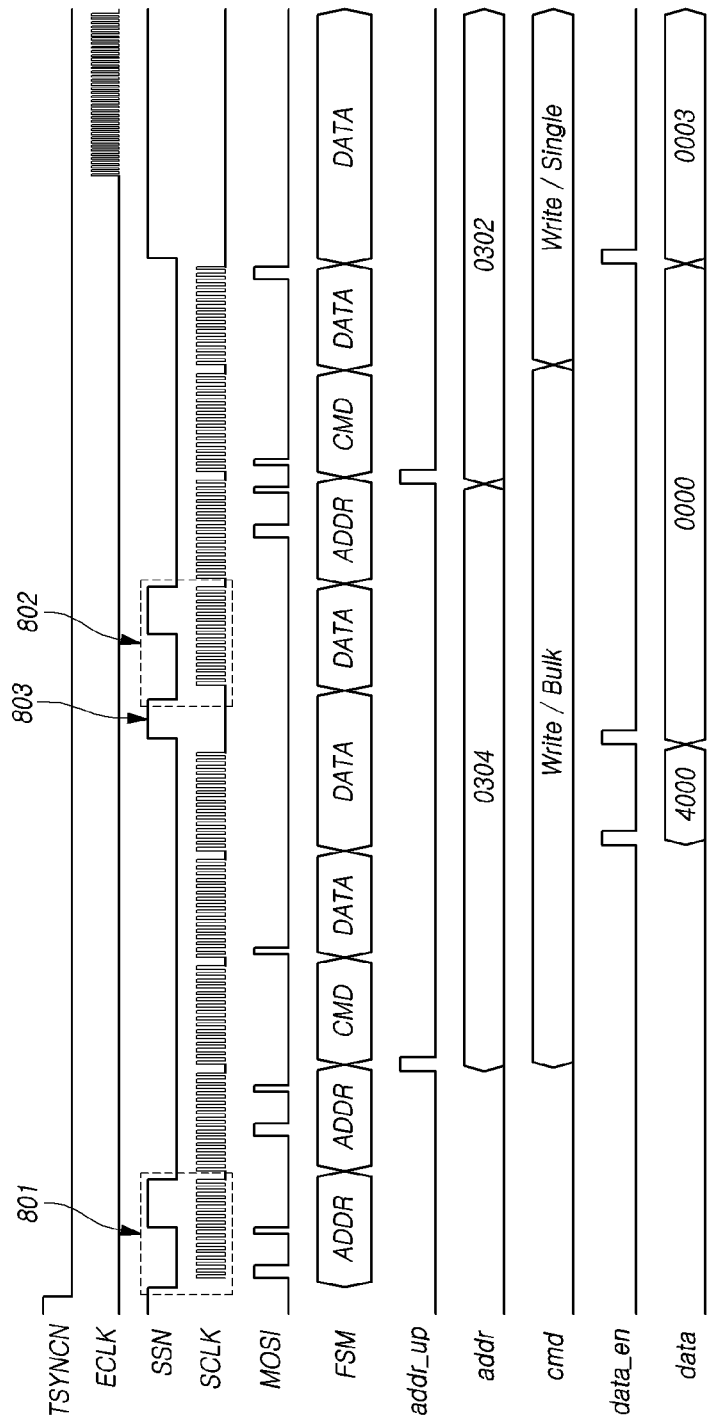
FIGS. 8 to 10 are diagrams illustrating examples of a specific method in which the touch controller transmits control data in EX 2 shown in FIG. 6 according to embodiments of the present disclosure.
Figure 9:
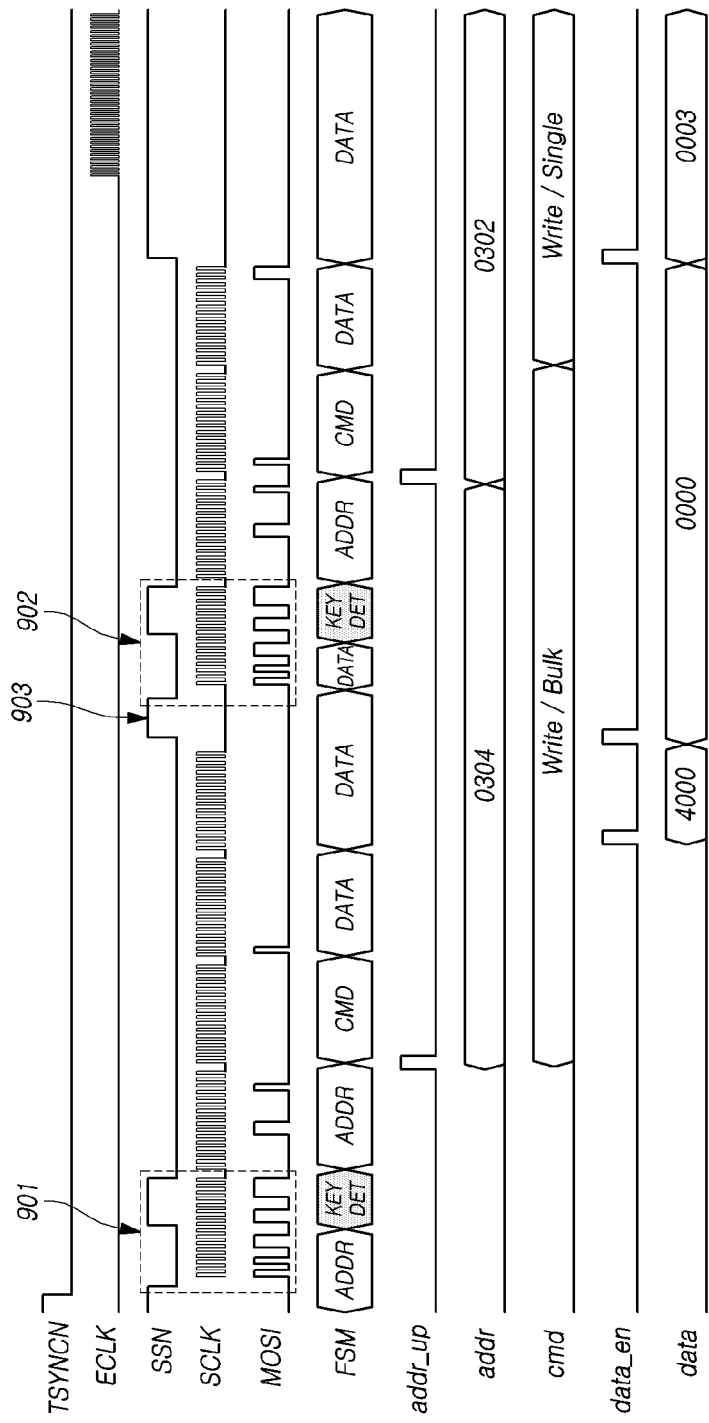
Figure 10:
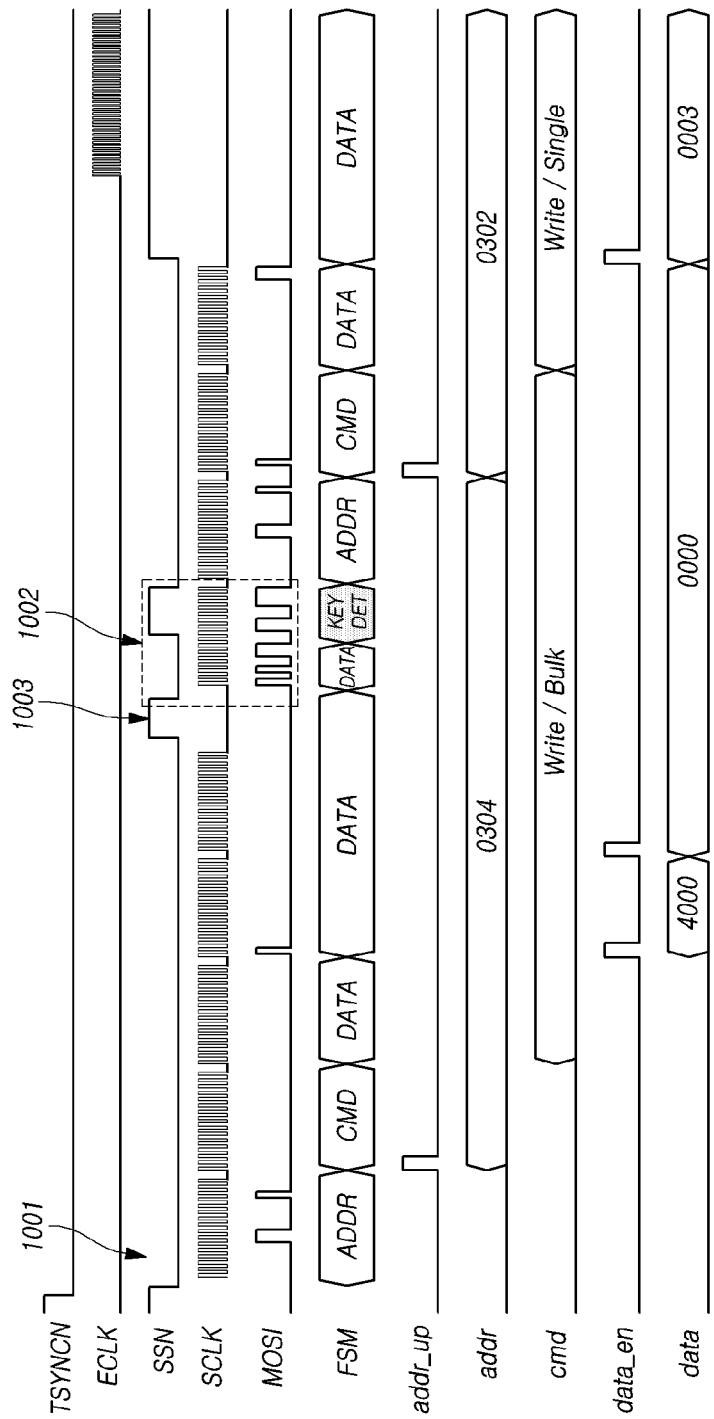

FIG. 7 is a diagram illustrating an example of a specific method in which the touch controller 220 transmits control data Cdata in EX 1 shown in FIG. 6. FIGS. 8 to 10 are diagrams illustrating examples of a specific method in which the touch controller 220 transmits control data Cdata in EX 2 shown in FIG. 6.

Referring to FIG. 6, a system clock signal ECLK may be output when a certain period has elapsed after a level of a touch synchronization signal TSYNCN is changed to a low level.

During a period before the system clock signal ECLK is output and after the touch synchronization signal TSYNCN at a low level is output, the touch controller 220 may transmit the control data Cdata to the touch driving circuit 210.

As an example, as in EX 1 shown in FIG. 6, in a period in which the system clock signal ECLK is not output, the touch controller 220 may transmit the control data Cdata to the touch driving circuit 210 during one data communication period.

Alternatively, as in EX 2 shown in FIG. 6, in a period in which the system clock signal ECLK is not output, the touch controller 220 may transmit the control data Cdata to the touch driving circuit 210 during two or more data communication periods.

In the case of EX 1 or EX 2, the touch controller 220 may control a level of a communication control signal SSN to transmit the control data Cdata to the touch driving circuit 210 during a period in which the system clock signal ECLK is not output.

Referring to FIG. 7, a system clock signal ECLK may not be output during a period in which a touch synchronization signal TSYNCN is at a high level. After the touch synchronization signal TSYNCN is changed to a low level, the system clock signal ECLK may be output. In FIG. 7, the touch synchronization signal TSYNCN, the system clock signal ECLK, a communication control signal SSN, a data clock signal SCLK, or MOSI data may be a signal or data transmitted from the touch controller 220 to the touch driving circuit 210. A portion shown below the MOSI data represents a signal or data according to an operation state inside the touch driving circuit 210.

After the touch synchronization signal TSYNCN is changed to a low level, the system clock signal ECLK may not be output for a certain period.

During a period in which the system clock signal ECLK is not output, a level of the communication control signal SSN may be changed to a low level. A period in which the communication control signal SSN is at a low level may be a data communication period.

The data clock signal SCLK may be output during a period in which the communication control signal SSN is at a low level. The data clock signal SCLK may be output during the data communication period in which the communication control signal SSN is at a low level.

Since the communication control signal SSN is changed from a high level to a low level and the data clock signal SCLK is output, the touch driving circuit 210 may use the data clock signal SCLK to recognize the data communication period in which the communication control signal SSN is at a low level.

Since the touch driving circuit 210 recognizes a state in which the communication control signal SSN is changed to a low level, the touch driving circuit 210 may recognize that the touch controller 220 transmits the control data Cdata.

The touch controller 220 may sequentially transmit an address, a command, and data.

The touch driving circuit 210 may recognize an address start time point based on a level change of the communication control signal SSN.

The touch driving circuit 210 may recognize an address start time point and may decode a data packet received from the touch controller 220. The touch driving circuit 210 may update the address and may write the data according to the command.

Since the data clock signal SCLK is output during a period in which the communication control signal SSN is at a low level, even during a period in which the system clock signal ECLK is not output, the touch driving circuit 210 may normally recognize the control data Cdata output by the touch controller 220.

Data communication between the touch controller 220 and the touch driving circuit 210 may be normally performed during a period before the system clock signal ECLK is output.

In some cases, the touch controller 220 may transmit the control data Cdata during two or more data communication periods in a period before the system clock signal ECLK is output.

In this case, by adjusting a level of the communication control signal SSN during the data communication period, the touch driving circuit 210 may normally recognize an address start time point and may process the data packet received from the touch controller 220.

Referring to FIG. 8, when a certain period has elapsed after a touch synchronization signal TSYNCN is changed from a high level to a low level, a system clock signal ECLK may be output.

Two or more data communication periods may be present in a period in which the touch synchronization signal TSYNCN is at a low level and the system clock signal ECLK is not output. FIG. 8 shows an example in which two data communication periods are present before the system clock signal ECLK is output. The data communication period may be a period in which a communication control signal SSN is at a low level and a data clock signal SCLK is output.

The communication control signal SSN at a low level may be output during each of the two data communication periods. The data clock signal SCLK may be output during each of the two data communication periods. Different data communication periods may be separated by a period in which the data clock signal is not output and a level of the communication control signal SSN is changed.

A level of the communication control signal SSN may be changed two or more times during the data communication period.

As an example, in a portion indicated by 801, a level of the communication control signal SSN may be changed to a low level at the same time when the data communication period starts and then may be changed to a high level. The communication control signal SSN may be changed to a high level and then changed to a low level again.

The data clock signal SCLK may be output during a period in which the communication control signal SSN is changed from a low level to a high level. That is, as in the portion indicated by 801, the data clock signal SCLK may be output during a period in which a level of the communication control signal SSN is maintained at a high level. The touch driving circuit 210 may use the data clock signal SCLK to recognize that a level of the communication control signal SSN is changed.

The touch driving circuit 210 may recognize an address start time point based on a period in which a level of the communication control signal SSN is changed. The touch driving circuit 210 may use the data clock signal SCLK to recognize that a level of the communication control signal SSN is changed.

During a second data communication period of the two data communication periods, as a portion indicated by 802, a level of the communication control signal SSN may be changed two or more times.

The communication control signal SSN may be changed to a low level and then changed to a high level again.

By using a change of the communication control signal SSN from a low level to a high level, the touch driving circuit 210 may recognize an address start time point of the control data Cdata transmitted during the second data communication period.

The touch driving circuit 210 may recognize an address start time point in the second data communication period and may normally decode and process the control data Cdata received from the touch controller 220.

Before the second data communication period starts, as in a portion indicated by 803, there may be a period in which the data clock signal SCLK is not output and a level of the communication control signal SSN is changed.

Since the portion indicated by 803 is a period that separates two data communication periods, the data clock signal SCLK may not be output. In addition, the system clock signal ECLK may not be output during the corresponding period.

Accordingly, as in the portion indicated by 803, the touch driving circuit 210 may not recognize that a level of the communication control signal SSN is changed.

Since the touch driving circuit 210 may recognize an address start time point based on a level change of the communication control signal SSN as in the portion indicated by 802 during the second data communication period, even when the touch driving circuit 210 does not recognize the communication control signal SSN in the portion indicated by 803, the touch driving circuit 210 may perform normal data communication during the second data communication period.

As described above, during a period in which the system clock signal ECLK is not output, the touch controller 220 may adjust a level of the communication control signal SSN and use the data clock signal SCLK to recognize an address start time point of the touch driving circuit 210.

Data communication between the touch controller 220 and the touch driving circuit 210 may be normally performed during a period before the system clock signal ECLK is output and after the touch synchronization signal TSYNCN is changed to a low level, thereby reducing power consumption of the touch sensing system 200 and also improving the efficiency of data communication.

Also, in some cases, the touch driving circuit 210 may recognize an address start time point using the communication control signal SSN, the data clock signal SCLK, and MOSI data.

Referring to FIG. 9, two data communication periods may be present in a period in which a touch synchronization signal TSYNCN is changed to a low level and a system clock signal ECLK is not output. Each of the two data communication periods may be a period in which a communication control signal SSN is at a low level and a data clock signal SCLK is output. The two data communication periods may be separated by a period in which the data clock signal SCLK is not output and a level of the communication control signal SSN is changed.

A level of the communication control signal SSN may be changed to a low level, and a data communication period may start. A level of the communication control signal SSN may be changed two or more times during the data communication period.

The data clock signal SCLK may be output during the data communication period.

As in a portion indicated by 901 or 902, during a period in which a level of the communication control signal SSN is changed from a low level to a high level and is changed from a high level to a low level again, MOSI data including specific pattern data may be transmitted.

As an example, as in the portion indicated by 901 or 902, during a period in which a level of the communication control signal SSN is changed, the touch controller 220 may transmit "AC" to HEX when the communication control signal SSN is at a low level and may transmit "CE" to HEX when the communication control signal SSN is at a high level.

As in a portion indicated by 903, a period in which the system clock signal ECLK and the data clock signal SCLK are not output and a level of the communication control signal SSN is changed may be present between the two communication periods.

When pattern data is input during a period in which a level of the communication control signal SSN is changed of the data communication period, the touch driving circuit 210 may recognize the pattern data as a KEY DET logic. After the touch driving circuit 210 recognizes the KEY DET logic, the touch driving circuit 210 may determine a time point at which a level of the communication control signal SSN is changed to a low level as a time point when data transmission starts.

The touch driving circuit 210 may recognize an address start time point based on the KEY DET logic.

The touch driving circuit 210 may accurately recognize an address start time point, may decode a data packet received from the touch controller 220, and may normally process data.

As described above, during a period in which the system clock signal ECLK is not output, the touch driving circuit 210 may determine an address start time point using the communication control signal SSN, the data clock signal SCLK, and the pattern data.

Even when the touch driving circuit 210 does not recognize the communication control signal SSN shown in the portion indicated by 903, the touch driving circuit 210 may recognize the KEY DET logic shown in the portion indicated by 902 to normally perform data communication with the touch controller 220.

Accordingly, only during a period in which the touch synchronization signal TSYNCN is at a level corresponding to a touch mode, the system clock signal ECLK may be output to reduce power consumption, and also, even during a period in which the system clock signal ECLK is not output, data communication between the touch controller 220 and the touch driving circuit 210 may be performed, thereby increasing the efficiency of the data communication.

In addition, in some cases, when two or more data communication periods are present during a period in which the system clock signal ECLK is not output, only during a data communication period subsequent to a second data communication period, a level of the communication control signal SSN may be changed to allow the touch driving circuit 210 to recognize an address start time point.

Referring to FIG. 10, in a state in which a touch synchronization signal TSYNCN is at a low level and a system clock signal ECLK is not output, the touch controller 220 may transmit data to the touch driving circuit 210.

As an example, two data communication periods may be present before the system clock signal ECLK is output.

During a first data communication period, a level of a communication control signal SSN may be changed to a low level.

During the first data communication period, as in a portion indicated by 1001, a level of the communication control signal SSN may be maintained at a low level without being changed.

During a second data communication period, a level of the communication control signal SSN may be changed two or more times.

As in a portion indicated by 1002, a level of the communication control signal SSN may be changed from a low level to a high level. Thereafter, a level of the communication control signal SSN may be changed to a low level again.

As in a portion indicated by 1002, the data clock signal SCLK may be output during a period in which a level of the communication control signal SSN is changed from a low level to a high level and is changed from a high level to a low level again.

During a period in which a level of the communication control signal SSN is changed from a low level to a high level, the touch controller 220 may transmit pattern data to the touch driving circuit 210.

As in a portion indicated by 1003, before the second data communication period, there may be a period in which the system clock signal ECLK and the data clock signal SCLK are not output and a level of the communication control signal SSN is changed.

In the case of the first data communication period, since a level of the communication control signal SSN is changed to a low level and the data clock signal SCLK is output, the touch driving circuit 210 may recognize a level change of the communication control signal SSN and may recognize an address start time point of the control data Cdata transmitted by the touch controller 220.

Accordingly, during the first data communication period, the touch driving circuit 210 may decode a data packet received from the touch controller 220 and may normally process data.

In the case of the second data communication period, the touch driving circuit 210 may recognize a KEY DET logic based on the communication control signal SSN, the data clock signal SCLK, and the pattern data. The touch driving circuit 210 may recognize an address start time point using the KEY DET logic.

Alternatively, in some cases, the pattern data may not be transmitted. The touch driving circuit 210 may recognize an address start time point based on a period in which a level of the communication control signal SSN is changed of the second data communication period.

As described above, the touch driving circuit 210 recognizes a time point at which the communication control signal SSN is changed from a high level to a low level as an address start time point and may decode a data packet received from the touch controller 220.

Accordingly, the touch driving circuit 210 may normally process the control data Cdata received from the touch controller 220 during a period in which the system clock signal ECLK is not output.

The above-described embodiments of the present disclosure will be briefly described below.

A touch display device 100 according to embodiments of the present disclosure may include a plurality of touch electrodes TE disposed in a display panel 110, a touch driving circuit 210 configured to drive the plurality of touch electrodes TE, and a touch controller 220 configured to control the touch driving circuit 210.

During at least one data communication period of a plurality of data communication periods in which the touch controller transmits data to the touch driving circuit, a level of a communication control signal SSN, which is output by the touch controller 220 and input to the touch driving circuit 210, may be changed two or more times.

During the data communication period in which the level of the communication control signal SSN is changed two or more times, the touch controller 220 may not output a system clock signal ECLK.

During the data communication period in which the level of the communication control signal SSN is changed two or more times, the touch controller 220 may transmit a data clock signal SCLK to the touch driving circuit 210.

A period in which the data clock signal SCLK is not output and the level of the communication control signal SSN is changed two or more times may be present before the data communication period in which the level of the communication control signal SSN is changed two or more times.

During the period in which the data clock signal SCLK is not output and the communication control signal SSN is changed two or more times, the system clock signal ECLK may not be output.

After a period of the data communication period in which the level of the communication control signal SSN is changed, the touch controller 220 may transmit control data Cdata to the touch driving circuit 210.

During the data communication period in which the level of the communication control signal SSN is changed two or more times, the touch controller 220 may transmit pattern data to the touch driving circuit 210.

During a period in which the level of the communication control signal SSN is changed two or more times of the data communication period, the pattern data may be transmitted.

The touch controller 220 may transmit control data Cdata to the touch driving circuit 210 after transmitting the pattern data.

The touch driving circuit 210 may recognize an address start time point based on the pattern data.

The data communication period in which the level of the communication control signal SSN is changed two or more times may be included in a period before the touch controller 220 outputs a system clock signal ECLK and after outputting a touch synchronization signal TSYNCN corresponding to a touch mode.

Two or more data communication periods may be included in a period before the system clock signal CLK is output and after the touch synchronization signal corresponding TSYNCN to the touch mode is output, and during a second data communication period of the two or more data communication periods, the level of the communication control signal SSN may be changed two or more times.

A touch sensing system 200 according to embodiments of the present disclosure may include a touch driving circuit 210 configured to drive a plurality of touch electrodes TE, and a touch controller 220 configured to control the touch driving circuit 210.

The touch controller 220 may output a system clock signal ECLK when a certain time has elapsed after a touch synchronization signal TSYNCN corresponding to a touch mode is output, a first data communication period and a second data communication period may be present before the system clock signal ECLK is output, and during at least one of the first data communication period and the second data communication period, a level of a communication control signal SSN, which is output by the touch controller 220 and input to the touch driving circuit 210, may be changed two or more times.

The touch controller 220 may transmit control data Cdata to the touch driving circuit 210 after a period in which the level of the communication control signal SSN is changed.

The touch controller 220 may transmit pattern data to the touch driving circuit 210 during a period in which the level of the communication control signal SSN is changed.

A touch controller 220 according to embodiments of the present disclosure may be configured to transmit data during two or more communication periods before outputting a system clock signal CLK and after outputting a touch synchronization signal TSYNCN corresponding to a touch mode and change a level of a communication control signal SSN during at least one period of the two or more data communication periods.

According to the above-described embodiments of the present disclosure, since the touch controller 220 does not output the system clock signal ECLK during a period in which the touch synchronization signal TSYNCN is at a high level and outputs the system clock signal ECLK only during a period in which the touch synchronization signal TSYNCN is at a low level, power consumption of the touch sensing system 200 can be reduced.

The touch controller 220 changes a level of the communication control signal SSN two or more times during a data communication period included in a period in which the system clock signal ECLK is not output, thereby allowing the touch driving circuit 210 to recognize an address start time point.

Accordingly, data communication between the touch controller 220 and the touch driving circuit 210 can be normally performed even during a period in which the system clock signal ECLK is not output, thereby reducing power consumption of the touch sensing system 200 and also improving data communication efficiency.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:
1. A touch display device comprising:
a plurality of touch electrodes in a display panel;
a touch driving circuit configured to drive the plurality of touch electrodes; and
a touch controller configured to control the touch driving circuit,
wherein, during at least one data communication period of a plurality of data communication periods in which the touch controller transmits data to the touch driving circuit, a level of a communication control signal that is output by the touch controller and input to the touch driving circuit changes a plurality of times,
wherein, during the at least one data communication period in which the level of the communication control signal is changed the plurality of times, the touch controller is configured to transmit a data clock signal to the touch driving circuit while the communication control signal is at a low level and while the communication control signal is at a high level.

2. The touch display device of claim 1, wherein, during the data communication period in which the level of the communication control signal is changed the plurality of times, the touch controller is configured to not output a system clock signal.

3. The touch display device of claim 2, wherein:
a period in which the data clock signal is not output is before the data communication period in which the level of the communication control signal is changed the plurality of times; and
during the period in which the data clock signal is not output, the level of the communication control signal is changed the plurality of times.

4. The touch display device of claim 3, wherein, during the period in which the data clock signal is not output and the communication control signal is changed the plurality of times, the system clock signal is not output.

5. The touch display device of claim 1, wherein, after a period in which the level of the communication control signal is changed of the data communication period, the touch controller is configured to transmit control data to the touch driving circuit.

6. The touch display device of claim 1, wherein, during the data communication period in which the level of the communication control signal is changed the plurality of times, the touch controller is configured to transmit pattern data to the touch driving circuit.

7. The touch display device of claim 6, wherein, during a period in which the level of the communication control signal is changed the plurality of times of the data communication period, the pattern data is transmitted.

8. The touch display device of claim 6, wherein the touch controller is configured to transmit control data to the touch driving circuit after transmitting the pattern data.

9. The touch display device of claim 6, wherein the touch driving circuit is configured to recognize an address start time point based on the pattern data.

10. The touch display device of claim 1, wherein the data communication period in which the level of the communication control signal is changed the plurality of times is included in a period before the touch controller outputs a system clock signal and after outputting a touch synchronization signal corresponding to a touch mode.

11. The touch display device of claim 10, wherein:
two or more data communication periods are included in a period before the system clock signal is output and after the touch synchronization signal corresponding to the touch mode is output; and
during a second data communication period of the two or more data communication periods, the level of the communication control signal is changed the plurality of times.

12. The touch display device of claim 10, wherein the touch controller outputs the system clock signal responsive to the touch synchronization signal changing from a high level to a low level, and
wherein a delay period is between a time point at which the touch synchronization signal is changed to a low level and a time point at which the system clock signal is output.

13. The touch display device of claim 1, wherein the touch controller is configured to sequentially transmit an address, a command, and data to the touch driving circuit during the at least one data communication period.

14. The touch display device of claim 1, wherein during the at least one data communication period, the level of the communication control signal is changed to a low level, then changed to a high level and then changed to the low level again.

15. A touch sensing system comprising:
a touch driving circuit configured to drive a plurality of touch electrodes; and
a touch controller configured to control the touch driving circuit,
wherein:
the touch controller is configured to output a system clock signal responsive to a certain time elapsing after a touch synchronization signal corresponding to a touch mode is output;
a first data communication period and a second data communication period occur before the system clock signal is output; and
during at least one of the first data communication period and the second data communication period, a level of a communication control signal, which is output by the touch controller and input to the touch driving circuit, is changed a plurality of times,
wherein, during the at least one of the first data communication period and the second data communication period in which the level of the communication control signal is changed the plurality of times, the touch controller is configured to transmit a data clock signal to the touch driving circuit while the communication control signal is at a low level and while the communication control signal is at a high level.

16. The touch sensing system of claim 15, wherein the touch controller is configured to transmit control data to the touch driving circuit after a period in which the level of the communication control signal is changed the plurality of times.

17. The touch sensing system of claim 15, wherein the touch controller is configured to transmit pattern data to the touch driving circuit during a period in which the level of the communication control signal is changed the plurality of times.

18. The touch sensing system of claim 17, wherein the touch controller is configured to transmit control data to the touch driving circuit after transmitting the pattern data.

* * * * *